United States Patent Office 3,597,437
Patented Aug. 3, 1971

3,597,437
STABILIZED POLYMERIZABLE HETEROCYCLIC
NITROGEN COMPOUNDS
Robert E. Reusser, Bartlesville, Okla., assignor to
Phillips Petroleum Company
No Drawing. Filed June 13, 1968, Ser. No. 736,601
Int. Cl. C07d 31/20
U.S. Cl. 260—290                                   8 Claims

ABSTRACT OF THE DISCLOSURE

Polymerizable heterocyclic nitrogen compounds are stabilized so as to inhibit coloration and prolific polymerization by admixing therewith a hydrocarbyl-substituted hydroxyphenylalkyl ether.

---

This invention relates to a novel process for stabilizing polymerizable heterocyclic nitrogen compounds and to such a stabilized composition of matter.

It is well recognized that the storage and handling of polymerizable heterocyclic nitrogen compounds has proved difficult. These compounds tend to become colored and additional procedures such as distillation are required to achieve an essentially colorless compound. When future use, such as for feedstocks or polymerization processes, contemplates a colorless end product, utilization of essentially colorless components is desirable.

Another problem incident to the storage and handling of polymerizable heterocyclic nitrogen compounds is their tendency to undergo polymerization. Consequently, unless the compound is stabilized, polymerization occurs resulting in a loss of the desired product and contamination by the polymerized material which may adversely affect the future use thereof.

The applicant has surprisingly discovered that hydrocarbyl-substituted hydroxyphenylalkyl ethers are effective to inhibit polymerization of polymerizable heterocyclic nitrogen compounds and applicant has further discovered that these hydrocarbyl-substituted hydroxyphenylalkyl ethers are excellent color inhibitors for said compounds.

It is an object of applicant's invention to provide a new method to inhibit polymerization of polymerizable heterocyclic nitrogen compounds.

Another object of the invention is to provide a new method to prevent coloration of the polymerizable heterocyclic nitrogen compounds.

Another object of the invention is to effect savings in providing a stabilized polymerizable nitrogen compound that need not be distilled in order to remove discoloration prior to use in future polymerization or like processes.

Another object of applicant's invention is to provide a method and a stabilized composition of matter to insure stable handling and storage conditions for polymerizable heterocyclic nitrogen compounds.

Other objects, advantages and features of applicant's invention will be apparent to those skilled in the art from the disclosures herein set forth.

The hydrocarbyl-substituted hydroxyphenylalkyl ethers which are employed according to the process of this invention can be represented as follows:

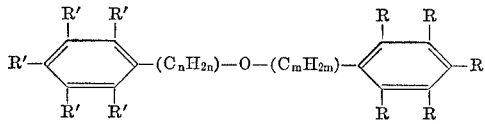

wherein one or two R groups and one or two R' groups are hydroxyl and each of the remaining R and R' groups is hydrogen or hydrocarbyl selected from alkyl, cycloalkyl, aryl, or combinations thereof, each hydrocarbyl group having 1 to 8 carbon atoms, at least one each of R and R' is hydrocarbyl, the total of carbon atoms in all R and R' groups per molecule is not more than 25; and each of $n$ and $m$ is an integer of 1 to 6.

Both symmetrical and unsymmetrical ethers can be employed according to this invention.

Some illustrative examples of suitable hydrocarbyl-substituted hydroxyphenylalkyl ethers comprise:

3,5-di-tert-butyl-4-hydroxybenzyl ether
3-methyl-4-hydroxybenzyl ether
3,5-dihydroxy-2,6-dimethylbenzyl ether
6-(2,3,5,6-tetrapropyl-4-hydroxyphenyl)hexyl ether
6[2-(2-phenylethyl)-4-hydroxyphenyl]hexyl ether
3-cyclohexyl-4-hydroxybenzyl ether
6-[2-phenyl-4-hydroxyphenyl]hexyl ether
6-[2-(2-cyclohexylethyl)-4-hydroxyphenyl]hexyl ether
6-[3-(2-ethylcyclohexyl)-4-hydroxyphenyl]hexyl ether
4[3-(2-ethylphenyl)-5-hydroxyphenyl]butyl ether
3,5-diethyl-4-hydroxybenzyl ether
3,5-dihexyl-4-hydroxybenzyl ether
3,5-dimethyl-4-hydroxybenzyl ether
3-methyl-4-hydroxybenzyl 3,5-dihydroxy-2,6-dimethylbenzyl ether According to this invention, one group of polymerizable heterocyclic nitrogen compounds which is stabilized in accordance with this invention are the mono- and di-vinylpyridines wherein a vinyl group is present in any of several positions in the pyridine ring. Alkyl groups can be present on the ring or on an alpha carbon atom of the vinyl group, but the number of carbon atoms of the combined alkyl groups should generally not be greater than 12. Such alkyl groups are preferably methyl and ethyl groups. Substituents which are attached to carbon atoms on the ring can be selected from the group consisting of hydrogen, alkyl, vinyl, and isopropenyl (alpha-methylvinyl) groups, at least one of said groups being vinyl or alpha-methylvinyl; the total number of carbon atoms in the alkyl groups being not greater than 12. Examples of such compounds include 2-vinylpyridine,
3-vinylpyridine,
4-vinylpyridine,
2,3,4-trimethyl-5-vinylpyridine,
3,4,5,6-tetramethyl-2-vinyl pyridine,
2-methyl-5-vinylpyridine,
3-ethyl-5-vinylpyridine,
2-6-diethyl-4-vinylpyridine,
2-isopropyl-4,5-divinylpyridine,
2-methyl-5-undecyl-6-vinylpyridine,
3-dodecyl-4-vinylpyridine,
2,4-dimethyl-5,6-diphenyl-3-vinylpyridine,
3-alpha-methylvinylpyridine, and similar substituted alkene pyridines.

According to this invention, other polymerizable heterocyclic containing a hetero nitrogen atom which are stabilized by the method and composition of matter of this invention include those vinyl and alpha-methylvinyl substituted heterocyclic nitrogen compounds in which the ring structure is unsaturated, partially saturated, and completely saturated. That is, such compounds as alkene substituted pyridines, quinolines, isoquinolines, piperidines, pyrroles, pyrrolidines, pyrrolidones, alkyl derivatives of the foregoing compounds, dihydro and tetrahydro pyridines, partially hydrogenated quinolines, isoquinolines, and pyrrolines (dihydropyrroles). Other vinyl and alpha-methylvinyl substituted derivatives of these heterocyclic nitrogen containing compounds are suitable objects for the purpose of this invention; some examples of which are 2-vinylquinoline, 8-methyl-2-vinylquinoline, 4-hexyl-5-vinylquinoline, 1-vinylisoquinoline, 5-methyl-1-isopropenylisoquinoline, vinylpyrrolidone, vinylpyrrole, vinylpiperidine, vinylpyrrolidine, and the like. Normally, the alkene substitutes will be attached to the ring carbon atoms. However, in compounds wherein the ring nitrogen is a secondary nitrogen atom the vinyl group can be attached to this ring nitrogen atom; some examples are N-vinylcarbazole and N-vinylpyrrolidone.

The inhibitors of this invention are particularly applicable to the stabilization of alkyl vinylpyridine compounds such as 2-methyl-5-vinylpyridine, 3-ethyl-5-vinylpyridine, and the like. The hydrocarbyl-substituted hydroxyphenylalkyl ether inhibitors of this invention are effective to inhibit both polymerization and color formation of the polymerizable heterocyclic nitrogen compounds which are generally described above.

According to the process of this invention, sufficient hydrocarbyl-substituted hydroxyphenylalkyl ether is admixed with the polymerizable heterocyclic nitrogen compound to effect stabilization, generally in a concentration of hydrocarbyl-substituted hydroxyphenylalkyl ether in the range of 0.01 to 10% by weight of the mixture, preferably in the range of 0.05 to 1%.

The hydrocarbyl-substituted hydroxyphenylalkyl ethers embodied in this invention can be employed to inhibit color formation and polymerization of the polymerizable heterocyclic nitrogen compounds under conditions wherein it is desired to stabilize such compounds, said inhibitors are generally most effective at ordinary storage temperatures in the range of about 0° C. to 35° C.

Hydrocarbyl-substituted hydroxyphenylalkyl ethers of this invention can be obtained from commercial sources or can be synthesized by any means known to the art.

The utility and operability of applicant's process and composition of matter is demonstrated by the following example, and said invention is not to be limited to the materials embodied therein but construed according to the disclosure as a whole.

EXAMPLE I

Into three containers, each of which contained about 15 ml. of freshly distilled 2-methyl-5-vinylpyridine, were added under a nitrogen atmosphere amounts of 3,5-di-tertiary-butyl-4-hydroxybenzyl ether as presented in Table I. A thorough mixing by conventional means of the two components was then effected.

Tests were run to determine coloration and polymer formation of the polymerizable heterocyclic nitrogen compounds and were made at intervals of 4, 11, 18, 28, 35, and 47 days as represented in Table I. Room temperature was maintained throughout the testing (about 72° F.) Color formation was determined by means of a conventional Hellige comparator. Determination of polymer level was made at room temperature by adding 1 drop of the respective methylvinylpyridine solution to 5 ml. of hexane. The unpolymerized methylvinylpyridine was soluble in hexane, but the polymer formed, being insoluble, was measurable.

TABLE I

| Days | 0 | 4 | 11 | 18 | 28 | 35 | 57 |
|---|---|---|---|---|---|---|---|
| Run 1 (0.5% stabilizer): | | | | | | | |
| Color [1] | ([2]) | 1 | 1 | 2-3 | 3 | 3 | 6 |
| Percent polymer | 0.00 | 0 00 | 0 00 | 0 00 | 0 00 | 0 00 | 0.00 |
| Run 2 (0.1% stabilizer): | | | | | | | |
| Color | ([2]) | 1 | 2-3 | 2-3 | | | |
| Percent polymer | 0.00 | 0.00 | 3-5 | 10 | ([3]) | | |
| Run 3 (control): | | | | | | | |
| Color | ([2]) | 1-2 | 3 | | | | |
| Percent polymer | 0.00 | 10-15 | Solid polymer—discarded | | | | |

[1] The Hellige scale is a set of standards to which samples are compared the larger the number, the more intense the color.
[2] Water white.
[3] Discarded.

The novelty of the applicant's invention is clearly exemplified by the foregoing data in demonstrating effectively stabilization of methyl-vinylpyridine with 3,5-di-tertiary-butyl-4-hydroxybenzyl ether.

As will be evident to those skilled in the art, various modifications of this invention can be made, or followed, in light of the teachings and discussion set forth without departing from the scope or spirit of the applicant's invention.

I claim:

1. A process to prevent prolific polymerization and coloration of a polymerizable vinyl or alpha-methyl vinyl substituted heterocyclic nitrogen compound of pyridine, quinoline, isoquinoline, piperidine, pyrrole, pyrrolidine, pyrrolidone, alkyl substituted derivatives of the foregoing compounds, dihydro or tetrahydro pyridine or partially hydrogenated quinoline, isoquinoline, or pyrroline, comprising admixing therewith hydrocarbyl-substituted hydroxyphenylalkyl ether with the polymerizable heterocyclic nitrogen compound to be stabilized to effect a concentration of from 0.01 to 10% by weight of said hydrocarbyl-substituted hydroxyphenylalkyl ether based on the total weight of the admixture; said hydrocarbyl-substituted hydroxyphenylalkyl ether having the formula:

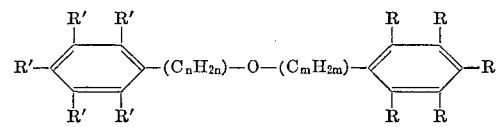

wherein one or two R groups and one or two R' groups are hydroxyl and each of the remaining R and R' groups is hydrogen or hydrocarbyl selected from alkyl having 1 to 6 carbon atoms, cyclohexyl, phenyl, or combinations thereof having 6 to 8 carbon atoms, at least one each of R and R' is hydrocarbyl, the total of carbon atoms in all R and R' groups per molecule is not more than 25; and each of $n$ and $m$ is an integer of 1 to 6.

2. The process according to claim 1 wherein the polymerizable heterocyclic nitrogen compound is a vinyl-substituted heterocyclic nitrogen compound.

3. The process according to claim 2 wherein said polymerizable heterocyclic nitrogen compound is a vinyl pyridine or substituted derivative thereof, and in the hydrocarbyl-substituted hydroxyphenylalkyl ether one R group and one R' group is hydroxyl, two R groups and two R' groups are alkyl having from 2 to 6 carbon atoms per alkyl group, the remainder of the R and R' groups are hydrogen and $n$ and $m$ are 1, and said concentration is in the range of from 0-05 to 1%.

4. The process according to claim 3 wherein said polymerizable heterocyclic nitrogen compound is 2-methyl-5-vinylpyridine and said hydrocarbyl-substituted hydroxyphenylalkyl ether is 3,5-di-tert-butyl-4-hydroxybenzyl ether.

5. A composition of matter comprised of a vinyl- or alpha-methylvinyl substituted polymerizable heterocyclic nitrogen-containing compound of pyridine, quinoline, isoquinoline, piperidine, pyrrole, pyrrolidine, pyrrolidone, alkyl substituted derivatives of the foregoing compounds, dihydro or tetrahydro pyridine, or partially hydrogenated quinoline, isoquinoline, or pyrroline and from 0.01 to 10% by weight, based on the total weight of said composition, of a hydrocarbyl-substituted hydroxyphenylalkyl ether represented as follows:

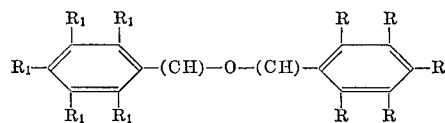

wherein one or two R groups and one or two R' groups are hydroxyl and each of the remaining R and R' groups is hydrogen or hydrocarbyl selected from alkyl having 1 to 6 carbon atoms, cyclohexyl, phenyl, or combinations thereof having 6 to 8 carbon atoms, at least one each of R and R' is hydrocarbyl, the total of carbon atoms in all R and R' groups per molecule is not more than 25; and each of $n$ and $m$ is an integer of 1 to 6.

6. A composition of matter according to claim 5 wherein said substituted-polymerizable heterocyclic nitrogen-containing compound is a vinyl pyridine or substituted derivative thereof, and in said hydrocarbyl-substituted hydroxyphenylalkyl ether one R group and one R' group is hydroxyl, two R groups and two R' groups are alkyl having from 2–6 carbon atoms per alkyl group, the remainder of the R and R' groups are hydrogen, and $n$ and $m$ are 1.

7. A composition of matter according to claim 6 wherein said substituted polymerizable heterocyclic nitrogen-containing compound is 2-methyl-5 vinylpyridine and wherein said hydrocarbyl-substituted hydroxyphenylalkyl ether is 3-5-di-tert-butyl-4-hydroxybenzyl ether.

8. A composition of matter according to claim 5 wherein said concentration of said hydrocarbyl-substituted hydroxyphenylalkyl ether is from about 0.01 to 10 weight percent of said composition.

References Cited

UNITED STATES PATENTS 3,255,160  6/1966  Roeder _____ 260—290

HENRY R. JILES, Primary Examiner

H. I. MOATZ, Assistant Examiner

U.S. Cl. X.R.

260—283(R), 293(R), 326.6, 326.8, 326.5(FL), (FN), (J), 612, 315

UNITED STATES PATENT OFFICE

CERTIFICATE OF CORRECTION

Patent No. 3,597,437            Dated 08/03/71

Robert E. Reusser

It is certified that error appears in the above-identified patent and that said Letters Patent are hereby corrected as shown below:

Claim 5, col. 4, between lines 60 and 67, the formula should read:

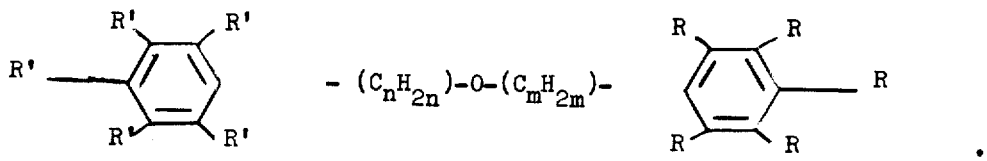

Signed and sealed this 6th day of June 1972.

(SEAL)
Attest:

EDWARD M. FLETCHER, JR.      ROBERT GOTTSCHALK
Attesting Officer              Commissioner of Patents